Figure 1:
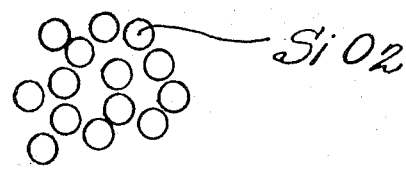

United States Patent [19]
Läufer et al.

[11] 3,873,337
[45] Mar. 25, 1975

[54] PROCESS FOR THE HYDROPHOBIZATION OF HIGHER DISPERSED OXIDES

[75] Inventors: Siegmar Läufer; Waldemar Roy, both of Rheinfelden, Germany

[73] Assignee: Deutsche Gold-und Silber-Scheidenstaft vormals Roessler, Frankfurt (Main), Germany

[22] Filed: Aug. 7, 1973

[21] Appl. No.: 386,429

[30] Foreign Application Priority Data
Aug. 14, 1972 Germany.............................. 2240014

[52] U.S. Cl............... 106/308 Q, 106/300, 106/304, 106/309, 117/100 S
[51] Int. Cl....................... C09c 3/00, C08h 17/04
[58] Field of Search ....... 106/308 Q, 300, 304, 309; 117/100 S, 100 M

[56] References Cited
UNITED STATES PATENTS
2,802,850  8/1957  Wetzel........................... 106/308 Q
2,993,809  7/1961  Bueche et al...................... 117/100

FOREIGN PATENTS OR APPLICATIONS
1,163,784  2/1964  Germany ....................... 106/308 Q Primary Examiner—Winston A. Douglas
Assistant Examiner—J. V. Howard
Attorney, Agent, or Firm—Cushman, Darby & Cushman

[57] ABSTRACT

Highly dispersed oxides of metals and/or silicon are hydrophobized by treatment with volatilizable organosilicon compounds in the gas phase. The oxide particles either come fresh from the production plant or are previously absolutely dried, and activated i.e., freed of physically and chemically bound water, in a fluidized bed with a dry inert gas stream at a temperature of 550° to 1000°C., preferably 600° to 950°C. under normal pressure in a few seconds to a few minutes, preferably in a time of 1 to 60 seconds. The oxide particles are reacted with a stoichiometrical mixture of at least one dialkyldichlorosilane and water in the ratio of 1:1 at a temperature of 350°C. to 650°C. in an atmosphere of $CO_2$. There can also be used diaryldichlorosilanes.

13 Claims, 5 Drawing Figures

PROCESS FOR THE HYDROPHOBIZATION OF HIGHER DISPERSED OXIDES

The invention is directed to a process for the hydrophobization of highly dispersed oxides, mixed oxides and/or oxide mixtures of metals or metalloids by treatment of the oxide particles with volatilizable organosilicon compounds in the gas phase.

It is known to make finely divided silica prepared by either precipitation or pyrogenically permanently hydrophobic by chemically changing their surfaces.

As agents for the hydrophobization, there have been used various organic silicon compounds, for example alkylsiloxanes, cycloalkyl siloxanes, alkylsilazanes, organoalkoxy silanes, alkoxysilanes and organochlorosilanes.

The organochlorosilane materials occupy a special position as they in turn produce the starting material for the other named hydrophobization agents.

On the one hand the type and scope of the different industrial processes as well as on the other hand the height of the requirements of the products producible are determinative of the decision as to which of the above named hydrophobization agents is chosen.

Thus, for example, using the expensive silazanes, it is possible to employ simple industrial plants, while using the cheap organochlorosilanes there is assumed a considerable industrial expense.

It is similar in regard to the quality of the producible hydrophobized products. While the products hydrophobized with the cheap organochlorosilanes according to suitable industrial processes satisfy the general requirements, for especially high requirements in many fields of application there can be used only those hydrophobization agents which give completely neutral products, as for example, the considerably more expensive organosiloxane, of which for example $D_2$, $D_3$ and $D_4$ Hexamethyl-disiloxane, Hexamethyl-tri-cyclosiloxane and Octamethyl-tetra-cyclo-siloxane are named.

The cheapness of the available hydrophobization agent, investment and operating costs of the industrial plant required, and quality requirements of the products which are producible determine essentially the practicality of the possible processes.

In preparing a mass product in which the hydrophobization of the filler develops increasingly, with replaceable operating costs being assumed, naturally the investment costs to be spent for the industrial plant diminish insofar as the product which can be produced in the first place satisfies the highest requirements.

All efforts have been concentrated on finding suitable processes which produce with the cheapest hydrophobization agents, namely the organochlorosilanes, products for the highest requirements, among others, for example, products which are completely free of chlorine and acid. This goal has not yet been obtained optimally.

Hydrophobic fillers for especially high requirements therefore until now had to be produced by processes which use the far more expensive organosiloxanes, organosilazanes or organoalkoxysilanes.

The hydrophobization of silicic acid (or silica) with organochlorosilanes can be carried out by various processes.

While the known processes for hydrophobization of precipitated silica without exception make use of a "slurry technique" whereby the most varied from silicon compounds deriving hydrophobization agents can be used, including organochlorosilanes, for the hydrophobization of highly dispersed pyrogenic silica in contrast to the slurry technique known hydrophobization processes in heterogeneous gas phase are advantageous.

Thus, for example according to German Auslegeschrift No. 1,163,784 pyrogenically obtained silicas and other highly dispersed oxides, directly after their production, are converted in a fluidized bed connected to the outlet of the reactor into hydrophobic finely divided fillers by means of for example, alkylchlorosilanes.

The process of German Ausleegschrift No. 1,163,784 consists of a surface treatment of highly dispersed oxides of metals and/or metalloids having OH groups on the surface. The oxides are in the form of individual oxides, or mechanical mixtures or mixed oxides or oxide mixtures which can be obtained by thermal decomposition of volatile compounds of these metals or metalloids in the vapor state in the presence of hydrolyzing and/or oxidizing gases or vapors and are, treated in a fluidized bed with materials suitable for reaction with hydroxyl groups, while the oxides in uncondensed condition fresh from the production plant after a preceding freeing from halogen, hydrogen halide and adsorptively bound water to the highest degree possible are homogeneously mixed with the material suitable for reaction with hydroxyl groups with the highest possible exclusion of oxygen. The mixture, together with small amounts of steam and in a given case together with inert gas, is heated in a continuous parallel flow process in a treatment zone constructed as an upright furnace at temperatures of 200° to 800°C., preferably 400° to 600°C., the solid and gaseous reaction products separated from each other and the solid products, in a given case, afterwards deacidified and dried, whereby contact with oxygen is to be avoided before cooling to below about 200°C.

According to the teachings of German Auslegeschrift No. 1,163,784 therefore the surface treatment with the materials suitable for reaction with OH groups must be undertaken in the presence of a small amount of steam because thereby, for example, thermally decomposed OH groups are again built up. Accordingly, it recommends the addition of about 0.5 to 2.0 millimoles of water per 100 square meters of surface area of the oxide, whereby the material for the reaction is dosaged depending on the surface area and the purpose of treatment. A highly dispersed silica with a surface area of 200 m²/g has 1 millimole/g of free OH groups. Accordingly, theoretically, there would be added 1 millimole of the material. In the practical carrying out of the process, however, it is recommended to use 1.5 millimole/g.

To produce the stated hydrophobic properties, there are used known hydrophobizing agents, especially alkyl or alkylaryl-halogenosilanes, preferably dimethyl dichlorosilane.

The fillers organophilized or hydrophobized by known process are used for numerous purposes, for example as "free-running agents" in powdery systems, as thickeners in varnishes, as fillers for synthetic resins and elastomers.

For special purposes, for example if they should be worked into silicone rubber, still further requirements for specific purposes are placed on the fillers, as for example, complete or nearly complete freedom from halogen. Likewise the named process (German Auslegeschrift No. 1,163,784) has in effect a certain, although also small, and in many cases not disturbing Cl content. By the type of process employed, which includes the nature of the oxide to be added, it affords a natural limit on the efficiency of the hydrophobization agent offered, namely, the organochlorosilane, which is noticeably far removed from quantitative yield.

A further disadvantage of the known process is that it cannot be used on commercial ("ready-made"), i.e., stored oxides produced pyrogenically and not coming directly from the production plant, since their water content of at least 1% or above (just so to the remarkable portion of "bonded silanol groups", which indicates "chemically bound" water likewise is of an order of magnitude of 1%) is opposite to a conversion of the process of German Auslegeschrift No. 1,163,784 to ready-made pyrogenic oxides.

Naturally this process cannot be transferred to, for example precipitated silica with its especially high water content, which is true for both adsorptive and "chemically bound" water.

The object of the present invention is to impart to both ready-made and freshly prepared highly dispersed oxidic fillers in an economically and industrially simple manner permanent and optimum hydrophobic and organophilic properties. Within the term "oxidic fillers" there are included highly dispersed oxides of metals and/or silicon which are obtained by either the precipitation method or by pyrogenic reaction of volatile metals or silicon halides.

Examples of suitable oxides are silica, titanium dioxide, alumina, zirconia, vanadium dioxide, vanadium pentoxide and iron oxides, e.g., $Fe_2O_3$.

The oxides obtained pyrogenically can be present as "individual oxides", as "mixed oxides", as an "oxide mix" or as an "oxide mixture".

Figure 2:
Figure 3:
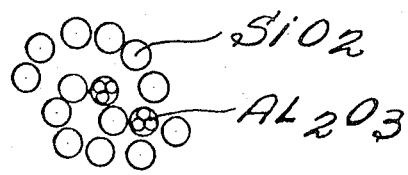
Figure 4:
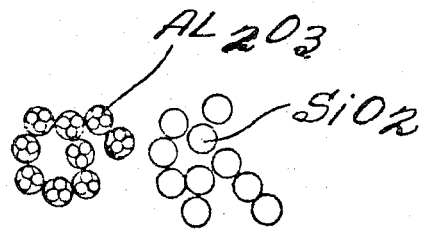
Figure 5:
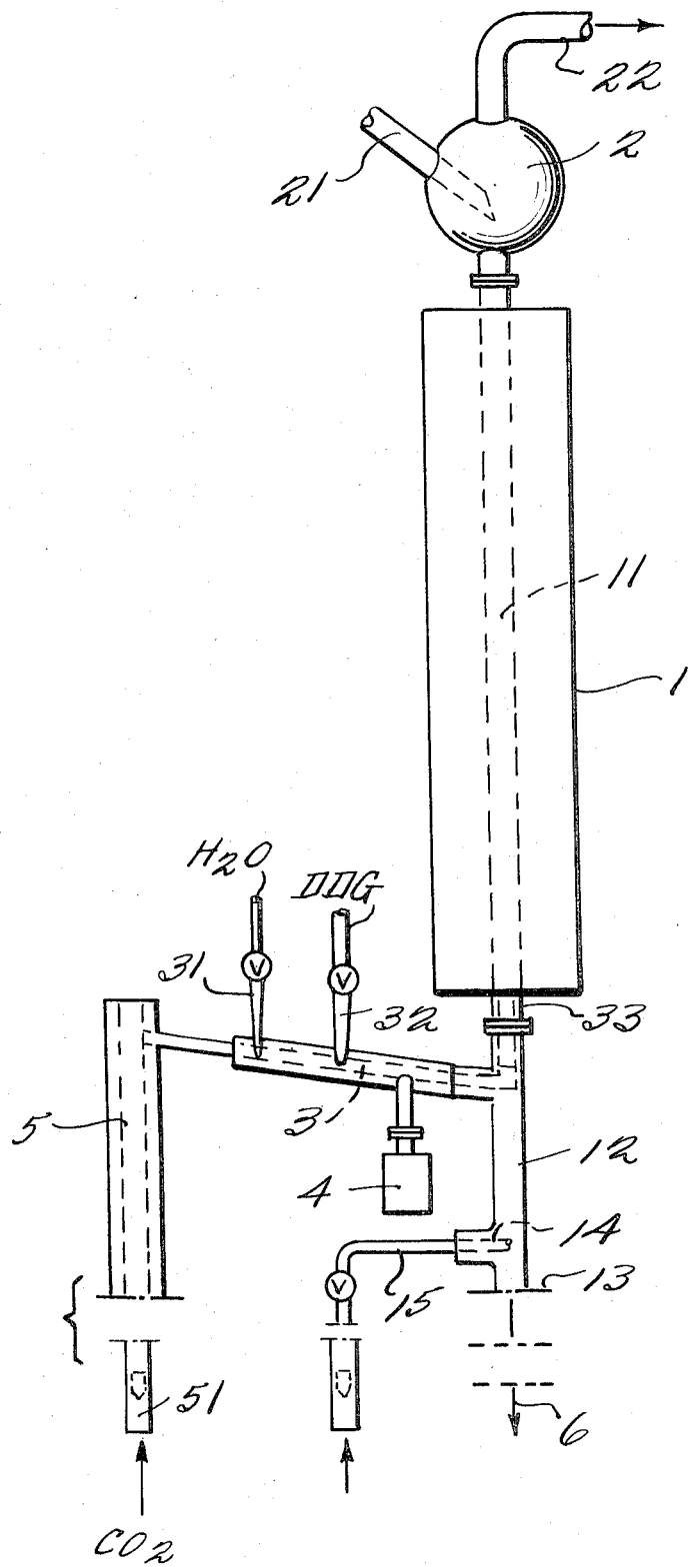

The invention will be understood best in connection with the drawings wherein:

FIG. 1 shows an individual oxide;
FIG. 2 shows mixed oxides;
FIG. 3 shows an oxide mix;
FIG. 4 shows an oxide mixture; and
FIG. 5 is a schematic illustration of the process.

Referring more specifically to FIG. 1 of the drawings, there are shown individual particles of $SiO_2$. They are flocks of individual primary particles. (Flocks = secondary particles.) In addition to $SiO_2$ (e.g., Aerosil, a pyrogenic silica) additional examples are $TiO_2$, $Al_2O_3$, $ZrO_2$, $V_2O_4$ and $Fe_2O_3$. The individual oxide of FIG. 1 can be produced for example according to the process of Bommer, German Auslegeschrift No. 1,150,955 or Brünner German Auslegeschrift No. 1,210,421. The entire disclosures of these two German Auslegeschrifts is hereby incorporated by reference. Thus the individual oxide can be produced from a volatile metal or metalloid compound with combustible gases and oxygen in a flame with the formation of water ("hydrolytic decomposition").

FIG. 2 shows mixed oxides in which there is a building in of foreign oxide in the primary particles. Flocks of a so-called mixed oxides include for example $Al_2O_3$ in $SiO_2$ and $TiO_2$ in $SiO_2$. By agitation of the particles in water there are formed stabile sols in aqueous dispersion. They can be formed according to East German Pat. No. 16,039; Wagner Canadian Pat. No. 573,556 or Wagner U.S. Pat. No. 2,951,044. The entire disclosure of the Wagner Canadian and United States patents is hereby incorporated by reference. The mixed oxides are produced for example in the same manner as the individual oxides of FIG. 1 but from mixtures of two volatile halides from a burner nozzle: two material mixture-reaction in one nozzle to the mixed oxides (a manufacturing process).

FIG. 3 shows an oxide mix in which there are flocks of separate primary particles, so-called co-coagulate (oxide mix) as for example $SiO_2/Al_2O_3$ or $SiO_2/TiO_2$. The oxide mix or "co-coagulate" can be formed according to Wagner German Auslegeschrift No. 1,066,552, Wagner U.S. Pat. No. 3,103,495 or Wagner U.S. Pat. No. 2,951,044, specifically at col. 3, lines 33 et seq. The entire disclosure of the Wagner German Auslegeschrift and the two Wagner United States patents is hereby incorporated by reference. The oxide mix or co-coagulate is prepared by reacting two volatile metal compounds, for example $SiCl_4$ and $TiCl_4$ from two nozzles in (one or) two flames or flame spaces and jointly coagulating two volatile, non-mixed materials from two nozzles of non-mixed materials from two nozzles in a flame space (one manufacturing process).

FIG. 4 shows an oxide mixture in which there are several separate flocks but each flock consists of primary particles. Examples are $SiO_2$ and $Al_2O_3$ or $SiO_2$ and $TiO_2$ as thickening agents. They can be formed according to Marsden U.S. Pat. No. 2,965,568, the entire disclosure of which is hereby incorporated by reference. Thus, the oxide mixture can be formed by mechanically mixing two or more oxides recovered in separate processes pyrogenically, or by precipitation or naturally. There are several methods of production and from these separate mixing processes.

The present invention proceeds from the starting problem of devising a process for the hydrophobization of highly dispersed oxides, mixed oxides or oxide mixtures of metals and/or silicon by treatment with volatilizable organosilicon compounds in the gas phase whereby the oxide particles either come fresh from the production plant or after previous treatment in a fluidized bed with a stream of dry inert gas, e.g., nitrogen at temperatures of 550° C. to 1000° C., preferably 600° C. to 950° C. under normal pressure in a few seconds to a few minutes, preferably during a time period of 1 to 60 seconds to absolutely dry the oxide, i.e., to also free the oxide from the chemically bound water, which process leads to unobjectionable hydrophobic products which are completely free of water and practically free of halogen or halogen halide.

The distinguishing features of the invention is that the oxide particles are reacted in a $CO_2$ atmosphere with a stoichiometric mixture transferred into the vapor phase of one (or more) organodihalosilanes, e.g., dialkyldichlorosilanes, and water in the molar proportions of not more than 1:1 at a temperature in the range of 350°C. to 650°C. and, in a given case, following to that are completely deacidified, preferably in a $CO_2$-steam atmosphere. The molar ratio of dihydrocarbyl dichlorosilane to water can be as low as 2:1.

The absolute freeing of the oxide particles from adsorptive and/or chemically bound water which precedes the hydrophobization causes those special surface conditions which not only make possible an adsorptive binding of the organosilicon compounds, but especially an optimum modification of the surface with the hydrophobizing agent because of the chemical reaction with the silanol groups. This effect is particularly plainly proven and explained using as a model pyrogenically produced silica.

The type of production of pyrogenic $SiO_2$ causes its surface structure to be formed essentially by three types of so-called surface hydroxyls which appear simultaneously in each $SiO_2$-aerogel. These three types of hydroxyl-groups are:

a. Silanol groups on the surface, which have no possibility of reciprocal action with each other inside their range of effect because of the spatial distance to other silanol groups and therefore are designated as isolated or "free silanol groups";

b. Silanol groups of a type similar to (a) but so close that they do enter into reciprocal action over hydrogen bridges and therefore are designated as bonded (hydrogen bridge bonding) silanol groups, and c. Hydroxyl group from water adsorbed on the surface of the silica aerogel.

Through the short time heat treatment to which the oxide particles are subjected prior to hydrophobization, the silanol groups (b) and the hydroxyl groups (c) are broken down so that only the free silanol groups (a) are preserved whereby the oxide particles become especially highly active.

The high activity relates not only to addition or adsorption reactive materials, but likewise both to chemical reactions on the silanol groups which with such a product proceed easier and more completely than with an untreated material or aerogel dried previously in customary manner and also to chemical reactions with the reactive siloxane groups formed in considerable amount in the short-time heating of the aerogel in the first step; which on the one hand, similar to the silanol groups for splitting off reactive material and subsequent chemical reactions thereon, and on the other hand are suited to the direct addition of, for example, polar XH compounds such as alcohols, e.g., methyl alcohol, ethyl alcohol, propyl alcohol, isopropyl alcohol, butyl alcohol, amyl alcohol, amines, e.g., tributyl amine, triethyl amine, etc.

The high activity caused by the absolute dryness of the supplied aerogel, which in this activated condition is particularly sensitive to materials capable of reaction, makes necessary the immediate treatment of the aerogel with the hydrophobization agent so that all phases of the process beginning with the absolute drying and the following hydrophobization continuously changing into each other are accomplished in a single upright tubular plant, whereby the highly dispersed oxide is fed in at the top of the plant and the finished product is continuously drawn off at the other end of the plant. The plant can consist of one tube or several also reciprocally displaced tubes, whereby there are provided partly heated, partly unheated zones with at least one place each for introduction of the hydrophobization agent.

As suitable hydrophobization agents there can be used organodihalosilanes of the general formula $RR^1-SiX_2$ where R and $R^1$ can be the same or different and can be alkyl or aryl and X is halogen, generally chlorine. While dimethyl dichlorosilane $[(CH_3)_2SiCl_2]$, is preferred, there can also be used other organodihalosilanes such as diphenyl dichlorosilane, diethyldichlorosilane, methyl ethyl dichlorosilane, dipropyl dichlorosilane, dibutyl dichlorosilane, methyl phenyl dichlorosilane, dimethyl dibromosilane and diethyl dibromosilane.

Furthermore, different types of organodichlorosilanes can be added, may it be through different entrances in the reaction space, or in the form of a mixture.

In each case the entrance is in the vapor phase together with water in stoichiometrical proportion.

The industrial advantages of the process of the invention are that the process can be carried out continuously, that no disturbing water is introduced in the hydrophobization reaction, that accordingly there is also no reduction in yield and no industrial problems due to polymer formation, which are caused by excess water. There is dosaged in exactly as much water as is required for completing the $>SiCl_2$ hydrolysis. Without anything additional, a pH of between 5 and 6 can be reached, almost neutral, which was not possible with the previous hydrophobization processes employing chlorosilanes.

While in the process of Brünner German Auslegeschrift No. 1,163,784, a complete deacidification is not possible based on the halogenosilane used, and based on the state of the oxide injected, and especially the considerable amount of steam which during the hydrophobization reaction simultaneously accomplishes the deacidification and also there is not attainable a nearly complete utilization of the organochlorosilane added, it has now been found that both defects can be eliminated in a surprising manner by simple precautions, namely:

1. By carrying out the process stoichiometrically in regard to the hydrolysis of the organohalogenosilane fed in. A prerequisite for this, for example, is the carrying out of an oxide conditioning according to Läufer German Offenlegungsschrift No. 1,767,226 and Läufer German Offenlegungsschrift No. 2,004,443. The entire disclosures of the two Läufer Offenlegungsschrifts are hereby incorporated by reference. Thus, silicon dioxide aerogel is treated with a dry gas stream at a temperature of 700°C. to 1000°C. in an inert atmosphere, e.g., air or an oxygen atmosphere at normal pressure in 1 second to several minutes.

2. By use of $CO_2$ as the carrier gas both for the hydrophobization agent and for the oxide particles during the hydrophobization or deacidification step.

The stoichiometrical feeding of dialkyl dichlorosilane and water, for example, in a mixing nozzle leads to nearly theoretical yields in regard to the organochlorosilane, specifically if there is fed ½ mole of $H_2O$ to 1 mole of DDS. The main reaction takes place with balancing according to the following pattern.

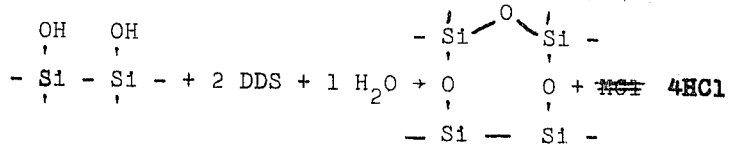

where DDS is dimethyl dichlorosilane.

A further disadvantage of the process of Brünner German Auslegschrift No. 1,163,784 is that a part of the organochlorosilane fed in the process condenses into polymers under the influence of the excess steam and of HCl, which deposits on the parts of the equipment, after some time disturb the process and therefore must be removed, entirely apart from the fact that in this way the usability of the alkylchlorosilane introduced is appreciably reduced.

It was entirely unexpected and extraordinarily surprising that by using $CO_2$ as the carrier gas in the process of the invention the disagreeable deposition of polymer on the parts of the equipment is completely absent.

A further advantage of the process of the invention is that there can be used without further treatment precipitated silica and other oxides or silica containing oxides.

It is noticable that by the said proceeding now precipitated silica can be hydrophobized with organohalogensilanes in a heterogenous vapor-phase, too, and even without application of $CO_2$ corresponding to the procedure described on page 14 number 1, otherwise additional working corresponding to number 2 on page 14 is of substantial advantage.

In practice it has proven effective to work with ½ to 1 mole of $H_2O$ to 1 mole of dimethyldichlorosilane (or other organodihalosilane), whereby optimally high dimethyl dichlorosilane yields and optimal hydrophobic products are obtained.

If one works without $CO_2$, the latter are first of all still strongly contaminated with HCl arising from the hydrophobization or hydrolysis reaction and must, therefore, be subjected to a subsequent deacidification with which a pH of about 3.5 can be attained, whereby it must be considered that the deacidification of hydrophobized pyrogenic silica always places higher demands than the deacidification of pyrogenic silica not reacted with organic material.

Even more surprising was a second effect by using $CO_2$ as the carrier gas.

While, as just mentioned, without the use of $CO_2$ as carrier gas, a subsequent deacidification is always necessary, by use of $CO_2$ according to the invention "stoichiometric" process a pH of 3.5 is already attained in the hydrophobization step so that a subsequent deacidification is generally spared.

The process can be carried out in more or less conventional apparatus or plants whereby a continuous method of operation has the advantage that it can operate in a moving bed or fluidized bed in co-current and/or countercurrent flow. In a preferred form, the oxide, free of water and so-called bonded silanol groups which can be accomplished for example according to Läufer German Offenlegungsschrifts Nos. 1,767,226 and 2,004,443 is getting from above in a vertical tubular furnace, whereby it in a given case, previously is freed of acid.

This type of tube furnace is shown in FIG. 5 of the drawings wherein there is shown a tube furnace 1 having a reaction zone 11. To the upper part of the tube furnace 1 there is flanged a separating chamber 2 in which there empties an inlet pipe 21 for the oxide to be treated. The upper part of the separating chamber 2 which serves as a moderating zone goes over into a waste gas line 22 for the hydrogen chloride gas formed and carrier gas. The tube furnace 1 is connected at its lower end to a tubular continuation 12 in which is fed the carrier gas from the supply pipe 15 through a side inlet 14. The continuation 12 is connected at its lower end with a baffle 13 which in turn is connected to the bunker 6. In the upper part of the continuation 12 there discharges laterally a mixing vessel (simultaneous vaporizer) 3 into which there is supplied through inlets 31 and 32 steam and hydrophobization agent. The mixing vessel 3 joins an inlet 33 in the lower part of the tube furnace 1. Furthermore, there is connected to the mixing vessel 3 an overflow container 4 as well as a preheater 5. The preheater 5 is connected to an inlet 51 for $CO_2$ gas.

The process can be described in connection with the apparatus as follows.

$CO_2$ goes from the preheater 5 heated to 200°–300°C. into the mixing vessel 3 heated to 200° to 400°C. and which simultaneously serves as a vaporizer for indosaged liquid water and dimethyldichlorosilane (DDS) or as a mixing chamber in the introduction of both $H_2O$ and DDS in the gas phase. The mixing vessel 3 is provided with the overflow container 4 so that condensate, which can arise by an operation disturbance in the vaporizer 3 does not go into the tube furnace 1. The preheated gas mixture consisting of $CO_2$ and the gaseous $H_2O$ and DDS in stoichiometric proportions goes via inlet 33 directly into the lower part of the tube furnace 1 whereby its flowing direction is given by a carrier gas stream entering from the inlet 14 in the tubular continuation 12 into the tube furnace 1. Thereby it meets directly after its exit from 33 into the lower reaction zone the oxide led from above through supply opening 21. After flowing through the tube furnace 1 and the separating and moderating chamber 2, the HCl formed together with $CO_2$ and in a given case additional carrier gas, e.g., nitrogen, leaves the apparatus over the waste gas line 22 while the hydrophobized oxide is led from the lower end of continuation 12 over the baffle 13 to the sacking or bunker 6.

In the tube furnace the oxide is reacted with the stoichiometrical mixture of $H_2O$ and, for example, DDS at temperatures in the range of 450°C. to 600°C. with the help of the counter-flowing carrier gases from below.

Since heat is formed in the reaction and the carrier gas is suitably preheated, the energy requirements of the reaction furnace first of all are effected by radiation or convection and, therefore, are held low.

The product leaving the reaction furnace can either be bunkered over a tubular line or, in very high requirements for deacidification, can be previously led to a deacidification step.

For the deacidification step, there can be used a process step similar in principle to the reaction tube whereby here also especial advantage is brought by the use of a $CO_2/H_2O$ mixture. In this manner there can be produced without difficulty a product with a pH of 5 to 6.

As previously indicated, the $CO_2$ should be present in the carrier gas employed in the hydrophobization treatment in an amount sufficient that the final product has a pH not lower than about 3.5.

The process of the invention is not limited to the method of operation described above. Thus, for example, the product leaving the reaction furnace after a more or less long residence time, which suitably is spent in the conveying system of the plant, can be freed from volatile components in a heated zone. It is likewise possible to operate the process entirely or partially in co-current flow.

EXAMPLE 1

Pyrogenic silica having the properties described in Laüfer German Offenlegungsschrift No. 1,767,226 (i.e., stored silica, heated in a dry gas stream at 700°–1,000°C. for several seconds), and a specific surface area of 130 m²/g (measured by the BET method) was treated in the described apparatus with a mixture of DDS (dimethyl dichlorosilane) and water (molar proportions 1:1).

There were fed pneumatically 900 grams/hour of the pyrogenic silica to the top of a reaction tube heated to 600°C. while in the lower part of the reaction tube there were nozzled in hourly 65 grams of DDS and 9 grams of water as a vapor mixture mixed with 0.17 m³ $CO_2$/hour. As a carrier gas there were additionally used 0.1 m³ $N_2$/hour. Both the $N_2$ and $CO_2$ were water free.

The product withdrawn directly after leaving the reaction furnace had a carbon content of 0.9% corresponding to a 90% utilization of the DDS added, a specific surface area of 90 m²/g (measured by the BET method) and a pH value of 3.5 (measured in standard manner). It was not wet by water.

The product remaining in the process led into a deacidification step operated with $CO_2$ and steam at 500°C. after leaving that step had a pH value of 5.2 (measured by standard procedure). The ratio of $CO_2$ to steam was 7 to 1 by volume.

EXAMPLE 2

In a manner corresponding to Example 1 in the described apparatus, there was treated a highly dispersed $Al_2O_3$ having a moisture content of less than 0.1%. The hydrophobic product formed was not wet by water.

EXAMPLE 3

In a manner corresponding to Example 1 using the described apparatus, there was heated a finely divided freshly produced mixed oxide of 99% $SiO_2$ and 1% $Al_2O_3$ having less than 0.1% moisture. The product formed was completely hydrophobic and was not wettable with water.

EXAMPLE 4

In a manner corresponding to Example 1, there was treated a precipitated silica having more than 5% moisture after it previously was completely freed of water and bound silanol groups by treatment in a fluidized bed with a dry inert gas stream (e.g. air). The product obtained was completely hydrophobic and not wettable with water.

EXAMPLE 5

In a manner corresponding to Example 3, there was treated an oxide mixture (co-coagulate) of 97% $SiO_2$ and 3% $Al_2O_3$ having less than 0.1% of moisture. The product obtained was not wettable with water.

What is claimed is:

1. A process of hydrophobization of a highly dispersed material which is an oxide, mixed oxide or oxide mixture of an element selected from the group consisting of zirconium, titanium, aluminum, vanadium, iron and silicon comprising subjecting particles of the dry oxide, mixed oxide or oxide mixture freed from bound water to a gaseous mixture of an organohalosilane of the formula

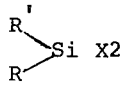

and steam in the molar ratio of 1:1 at a temperature of 350°C. to 650°C. in a $CO_2$ atmosphere wherein R and R' are alkyl of 1 to 4 carbon atoms and aryl and X is halogen.

2. A process according to claim 1 wherein X is chlorine.

3. A process according to claim 1 wherein the subjected particles come from stored material which has then been treated in a fluidized bed with dry inert gas steam at temperatures in the range from 550°C. to 1000°C. under normal pressure from a time of 1 second to a few minutes.

4. A process according to claim 1 wherein there is sufficient $CO_2$ to provide a pH of 3.5 in the product.

5. A process according to claim 4 wherein the organohalosilane is dimethyl dichlorosilane.

6. A process according to claim 4 wherein the oxide particles after the hydrophobization are completely deacidified.

7. A process according to claim 6 wherein the deacidification is carried out in the gaseous phase in a $CO_2$ atmosphere.

8. A process according to claim 1 wherein the highly dispersed material is pyrogenically prepared silica.

9. A process according to claim 1 wherein the highly dispersed material is precipitated silica.

10. A process according to claim 1 wherein the highly dispersed material is finely divided aluminum oxide.

11. A process according to claim 1 wherein the highly dispersed material is a mixed oxide consisting of $Al_2O_3$ and $SiO_2$ as an oxide mixture or a mixture of the oxides.

12. A process according to claim 1 wherein the hydrophobization is carried out in swirl- or fluidized bed.

13. A process according to claim 7 wherein the deacidification is carried out in a swirl- or fluidized bed in a counter-current process.

* * * * *